US011352122B2

(12) United States Patent
Gibbert et al.

(10) Patent No.: US 11,352,122 B2
(45) Date of Patent: Jun. 7, 2022

(54) WING SYSTEM FOR AN AIRCRAFT WITH A FLOW BODY AND A COVER PANEL

(71) Applicant: Airbus Operations GmbH, Hamburg (DE)

(72) Inventors: Markus Gibbert, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 305 days.

(21) Appl. No.: 16/554,963

(22) Filed: Aug. 29, 2019

(65) Prior Publication Data

US 2020/0070954 A1 Mar. 5, 2020

(30) Foreign Application Priority Data

Aug. 30, 2018 (DE) .......................... 102018121182.1

(51) Int. Cl.
*B64C 9/12* (2006.01)
*B64C 9/02* (2006.01)
*B64C 9/16* (2006.01)

(52) U.S. Cl.
CPC .................. *B64C 9/12* (2013.01); *B64C 9/02* (2013.01); *B64C 9/16* (2013.01)

(58) Field of Classification Search
CPC .... B64C 9/02; B64C 9/12; B64C 9/16; B64C 9/18; B64C 2009/143
See application file for complete search history.

(56) References Cited

U.S. PATENT DOCUMENTS

| | | | | |
|---|---|---|---|---|
| 2,556,326 A | * | 6/1951 | Grant | B64C 9/16 244/216 |
| 2,772,058 A | * | 11/1956 | Grant | B64C 21/02 244/216 |
| 4,120,470 A | * | 10/1978 | Whitener | B64C 9/20 244/213 |
| 4,353,517 A | * | 10/1982 | Rudolph | B64C 9/20 244/216 |
| 4,702,442 A | * | 10/1987 | Weiland | B64C 9/16 244/216 |

(Continued)

FOREIGN PATENT DOCUMENTS

| | | |
|---|---|---|
| EP | 1 787 905 A2 | 5/2007 |
| EP | 2 669 189 | 12/2013 |

(Continued)

OTHER PUBLICATIONS

European Search Report cited in EP 19188512.8 dated Jan. 14, 2020, 7 pages.

(Continued)

*Primary Examiner* — Richard R. Green
*Assistant Examiner* — Arfan Y. Sinaki
(74) *Attorney, Agent, or Firm* — Nixon & Vanderhye P.C.

(57) ABSTRACT

A wing system (2) for an aircraft includes a movable flow body (6) and a cover panel (8), wherein the flow body (6) and the cover panel (8) both are movably supported on a main wing body (4). While the flow body (6) is actively driven into upwards or downwards deflected positions, the cover panel (8) is coupled with the flow body (6) to follow its motion. The cover panel covers a part of the flow body (6) and the main wing body (4) in order to provide a substantially continuous, closed outer contour.

17 Claims, 2 Drawing Sheets

(56) References Cited

U.S. PATENT DOCUMENTS

| | | | |
|---|---|---|---|
| RE32,907 E * | 4/1989 | Rudolph | B64C 9/16 244/212 |
| 7,243,881 B2 * | 7/2007 | Sakurai | B64C 9/20 244/212 |
| 2007/0176051 A1 | 8/2007 | Good et al. | |
| 2014/0145039 A1 * | 5/2014 | Beyer | B64C 9/16 244/215 |
| 2016/0251074 A1 * | 9/2016 | Tsai | B64C 9/16 244/215 |
| 2019/0210711 A1 * | 7/2019 | Lorenz | B64C 13/00 |

FOREIGN PATENT DOCUMENTS

| | | |
|---|---|---|
| EP | 2 738 087 | 6/2014 |
| EP | 3 216 694 | 9/2017 |
| EP | 2 808 250 | 1/2018 |
| EP | 3 301 018 | 4/2018 |

OTHER PUBLICATIONS

Search Report cited in German Application No. 10 2018 121 182.1 received Aug. 30, 2018, 7 pages.

* cited by examiner

WING SYSTEM FOR AN AIRCRAFT WITH A FLOW BODY AND A COVER PANEL

RELATED APPLICATION

This application claims priority to German Patent Application DE 102018121182.1 filed Aug. 30, 2018, the entirety of which is incorporated by reference.

TECHNICAL FIELD

The invention relates to a wing system for an aircraft as well as an aircraft comprising such a wing.

BACKGROUND OF THE INVENTION

A wing system for an aircraft, in particular of a commercial aircraft, usually comprises a plurality of movable flow bodies to selectively adjust the aerodynamic behavior of the aircraft. Commonly, flow bodies in the form of leading edge slats, trailing edge flaps, ailerons, spoilers, etc. are used. For example, it is known to use trailing edge flaps that are deflectable from a neutral position, in which they are part of a clean wing contour, and extended positions, in which they are moved further downstream and downwards to act as high lift flaps. Concepts exist, in which flaps are used as high lift flaps and ailerons at the same time. In this case, the flaps are usually referred to as flaperons and are adapted to also be movable in an upward direction.

For example, European Patent EP 2 808 250 B1 shows an aircraft flap with aileron functionality. The flap comprises a flap body and an actuation mechanism for the aircraft flap, the actuation mechanism comprising a crank, a displacement shaft and a rotatable linear-motion bearing in which the displacement shaft is slidably supported. By moving the crank, the flap is swiveled upwards or downwards. A rotary vane is fixedly attached to the linear-motion bearing and the outer surface of the rotary vane proximate to the flap body has a contour substantially conforming to the contour of the flap body. The rotary vane follows the movement of the linear-motion bearing in order to keep the interface between the flap body and the outer edges of the aircraft wing profile smooth.

SUMMARY OF THE INVENTION

For optimizing the aerodynamic characteristics, it is feasible to provide a substantially smooth and continuous surface of the wing also when a flaperon or similar device is moved between different angular positions. However, using a vane with a surface that conforms the surface of a flap body may require a fairly large installation space.

The invention may be embodied as a wing system for an aircraft having a movable flow body, which is covered by a component that follows the motion of the flow body and that does not require a large installation space.

A wing system for an aircraft is proposed, the system comprising a main wing body, a movable flow body, a cover panel, a support structure attached to the main wing body, and a first link swivably coupled to the flow body with a first end of the first link. The support structure protrudes through the contour of the main wing body. Further, the flow body is positioned downstream of the main wing body and is swivably coupled to a first joint at an end of the support structure, such that the flow body is swivable around the first joint from a neutral position into upwards or downwards deflected positions. The cover panel is positioned between the main wing body and the flow body, wherein the cover panel is movably coupled to the main wing body and swivably coupled to a second end of the first link to follow the motion of the flow body at least partially, and wherein the main wing body, the cover panel and the flow body are designed to create a closed wing contour at least in the neutral position.

The main wing body is to be interpreted as a main structural component of the wing system and carries additional components, e.g. for influencing the flow or for storing fuel. It may extend from an aircraft fuselage into the direction of a wing tip. The main wing body carries the loads that arise during operation of the aircraft. The design and structural composition of the main wing body may be selected from a wide variety of common concepts. Particularly, the main wing body may be a rigid part of a wing.

The movable flow body is arranged at a rear side of the main wing body, which corresponds to a downstream position. The flow body may be designed similar to a trailing-edge flap or another intended flow influencing flow body. The flow body may comprise a rounded leading edge and a narrow trailing edge. The flow body is adapted for being swivable around a first joint, such that it follows a circular motion path. It is intended that the flow body can move from a neutral position into upward and downward deflected positions. By moving in these different directions, the flow body may influence the flow similar to an aileron and/or a high lift flap. However, the functionality of the flow body depends on the position of the first joint. By changing the position of the first joint, it is possible to adjust the ratio between an angular adjustment of the flow body orientation and a more translational motion of the flow body in certain angular ranged. Hence, depending on the position of the first joint and the momentary deflection angle, mainly a change in the wing area or the wing camber is conducted.

The support structure is capable of carrying the first joint in a desired position relative to the main wing body. The support structure may be a rigid structure. It may be realized by a kind of framework, which consists of a plurality of interconnected links, which together form a lightweight structure. The actual design depends on the size and required shape in order to minimize its weight. The support structure extends away from the main wing body and thus protrudes through the contour of the main wing body. By designing the shape and size of the support structure, the position of the first joint is influenced. The orientation, extension and dimension of the support structure depends on the desired motion of the flow body and potential further movable elements to be supported by the support structure.

The cover panel may be a substantially flat component, which merely acts as a cover for covering a transition between the main wing body and the flow body. The cover panel may be held by a cover panel guide or support. For example, the cover panel may be coupled to the main wing body in a rotatable manner through using an angular joint.

Depending on the position and orientation of the flow body, the cover panel may be placed on an upper or a lower side of the wing system to cover the transition between the main wing body and the flow body. If the flow body is provided as a trailing-edge flap or a flaperon, the cover panel may be arranged on the upper side of the wing system.

The first link comprises two opposed ends, which are referred to as the first end of the first link and the second end of the first link. While the first end is coupled with the flow body, the second end is coupled with the cover panel. The term "coupled" is to be understood as being directly or indirectly connected. This means that also a further element may be arranged between the respective end of the first link and the flow body or the cover panel, such as a link or a structure.

By coupling the cover panel to the main wing body and swivably coupling it to the first link leads to introducing a force onto the cover panel. The movable support of the cover panel on the main wing body together with the motion of the first link influences the motion of the cover panel. Consequently, through a suitable dimensioning of the system components, the cover panel directly follows the motion of the flow body.

Hence, the system according to the invention provides a movable flow body, which may selectively influence the air flow around the wing system. The wing system has a closed contour at least in the neutral position and the cover panel directly follows the motion of the flow body during its deflection. Consequently, an aerodynamically advantageous design of a wing system is provided, which allows to reduce the installation space inside the main wing body.

The support structure may protrude downward from a bottom side of the main wing body. Hence, the first joint is arranged underneath a bottom side of the main wing body. Depending on the axial position of the first joint This may lead to a mainly translational motion of the flow body in a first deflection range. Thus, the flow body may act as a trailing-edge flap to also increase the wing surface when deflected to a downwards deflected position.

In an advantageous embodiment, the support structure is designed such that the first joint is arranged forward the flow body and underneath the cover panel in the neutral position. Consequently, when the flow body swivels around the first joint, it will move backwards and downwards or forward and upwards. Thus, an increase in camber and an increase in the total wing surface can be conducted by swiveling the flow body downwards. The actual position of the first joint and, consequently, of the support structure, may be defined during the aerodynamic design of the wing. Hence, if a more clear motion in a rearward direction is desired, the first joint may be moved further backwards.

The support structure may be rigidly attached to the main wing body. The support structure may be fixed relative to the main wing body and not move with respect to the main body. The position of the first joint relative to the main wing body is thus fixed.

In a still further exemplary embodiment, the wing system further comprises a connecting structure, which is attached to an underside of the flow body and coupled to the first joint. It allows to couple the flow body with the first joint and basically bridges the distance between a suitable attachment position at the underside of the flow body to the first link, which may be in a relatively large distance.

The connecting structure may be rigidly attached to the flow body. The connecting structure may thus be designed similar to the support structure, e.g. as a framework structure. This allows to provide larger distances to the first joint. The support of the flow body is therefore quite simple, but with a suitable design of the support structure and the connecting structure allows to move the flow body over a dedicated angle range to serve as a flap or an aileron.

A second link may be rigidly attached to an underside of the cover panel and is swivably connected to the first link by a second joint, which is arranged at a distal end of the second link. For example, the second link may be rigidly connected to the cover panel. The second link can be designed so as to reach further backwards to be coupled with the first link.

The second link may extend downwards and rearwards from the underside of the cover panel. The second link therefore minimizes a connection length between the second link and the first link and, besides that, is arranged in the vicinity of the flow body.

In this regard, the second joint is may be positioned below the flow body at least in the neutral position. The length of a connecting element that connects the second joint and the first link may be reduced and adapted to the desired relation of motions between the flow body and the cover panel.

Still further, the second link may at least partially extend parallel to a cover panel chord. This allows to connect and rotate the second link and the cover panel rigidly and to rotate around a common hinge point. A parallel motion is not possible.

The first joint may be arranged forward of the second joint in the neutral position. Depending on the arrangement of the remaining components, the motion of the cover panel may be slightly less pronounced than the motion of the flow body, on which it is based. Consequently, canting or jamming between the cover panel and the flow body may be prevented.

Still further, the first link may be swivably coupled to the flow body at a third joint, which is arranged at an underside of the flow body, wherein the third joint is arranged directly above the second joint or displaced in a rearward direction along 25% of a length of the flow body chord at a maximum in the neutral position.

A flow body chord and the first link enclose an angle of 75 to 105° in the neutral position. Consequently, the first link is substantially perpendicular to the flow body chord.

The wing system further comprises an actuator, which is coupled with the main wing body and the flow body to move the flow body and the cover panel concurrently.

The invention further relates to an aircraft comprising a wing having the above-mentioned features.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
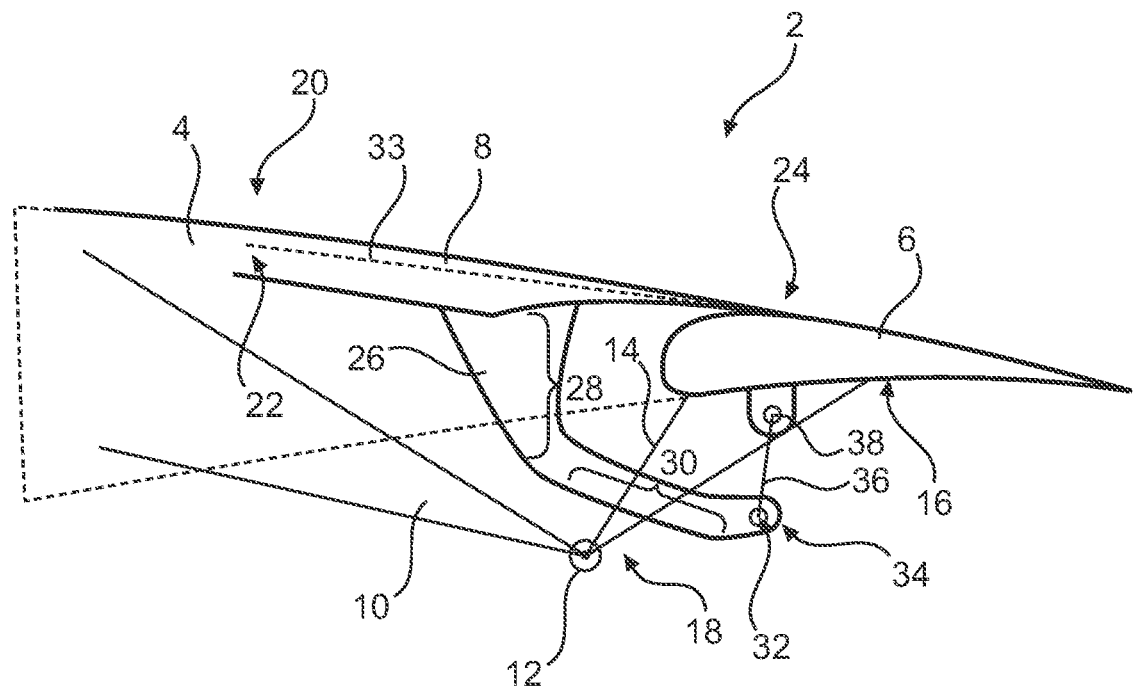
FIG. 1 shows a wing system in a neutral position.

FIG. 1 shows a wing system 2 having a main wing body 4, a trailing edge flap 6 as a flow body and a cover panel 8. In this illustration, the components of the upper surface of the main wing body, upper surface of the trailing edge flap and the cover panel, are in a neutral position and form a closed wing contour. The main wing body 4 is a rigid structure, which is exemplarily attached to a wing box arranged in a fuselage of an aircraft (not shown). The structure and shape of the main wing body 4 may include a leading edge, a trailing edge, an upper skin extending between the leading and trailing edges, and a lower skin extending between the leading and trailing edges.

In this exemplary embodiment, a support structure 10 is rigidly attached on the main wing body 4 and extends in a downwardly, rearwardly facing direction. The support structure 10 is illustrated as a simple triangle, which is strictly simplified illustration of the support structure. The support structure 10 may be embodied as a spatial framework structure that supports a first joint 12.

The flap 6 is arranged at a rear end of the main wing body 4 and adds to the main wing body 4 to complete the outer shape of the wing system 2. In this exemplary embodiment, a connecting structure 14 is rigidly attached to an underside 16 of the flap 6. In the neutral position shown in FIG. 1, the connecting structure points downwardly and forwardly. At a distal end 18, the connecting structure 14 is connected to the first joint 12. Hence, the combination of connecting structure 14 and flap 6 can swivel around an axis defined by the first joint 12. The flap may be driven through an actuator, which is coupled with the main wing body 4 or the support structure 10 and the connecting structure 14 or another point on the flap 6.

The main wing body 4 comprises a cut-out (slot) 20 at its upper side, in which the cover panel 8 is arranged. The cover panel 8 extends from a forward end 22 to a rearward end 24, which is directly on an upper side of the flap 6. The upper side of the wing system 2 is completely closed at least in the neutral position. This means, that the upper surface (skin) of the main wing body 4, of the cover panel 8 and of the flap 6 constitute a continuous closed surface. The cover panel 8 may follow the motion of the flap 6. For this, a second link 26 is attached to an underside of the cover panel 8. The second link 26 may have a dog-leg shaped as is illustrated in FIG. 1, wherein the second link includes a mainly perpendicular section 28 and a mainly parallel section 30. The terms perpendicular and parallel relate to a cover panel chord axis 33. The second link 26 comprises a second joint 32, which is arranged at a distal end 34 of the second link 26. In the neutral position, the second joint 32 is arranged substantially below a trailing edge 24 of the cover panel 8 and under the flap 6.

For an interconnection of flap 6 and second link 26, a first link 36 is provided, which extends from the second joint 32 to a third joint 38, which is positioned at the underside of the flap 6. Hence, if the flap 6 is moved, the third joint 38 moves in a swiveling motion around the first joint 12 and consequently, the second joint 32 is moved accordingly. In order for the cover panel 8 to move, it is supported to the main wing body 4 to limit its motion. For example, this may be conducted by a further rotary joint (not shown).

Figure 2:
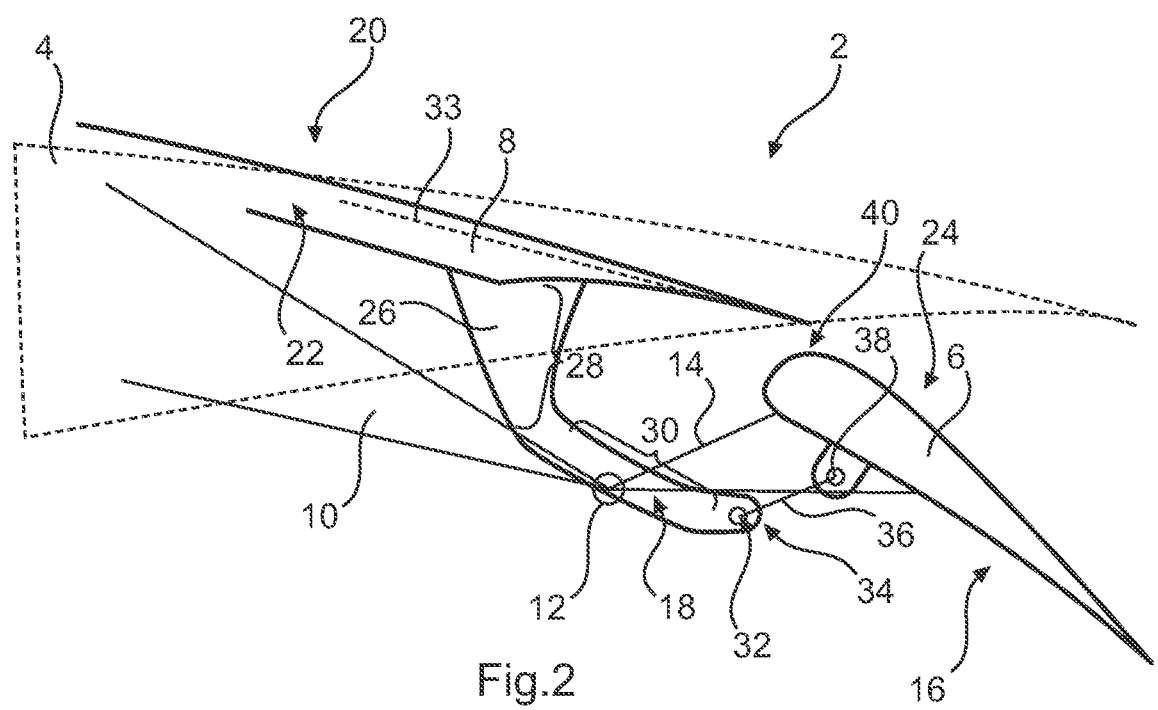
FIG. 2 shows the wing system of FIG. 1 with a flow body in a downward deflected position.

FIG. 2 shows the wing system 2 with the flap being extended about 40°. Here, the connecting structure 14 is swiveled about 40° around the first joint 12 and the first link 36 pushes the second joint 32 in a slightly forward position. Hence, the cover panel 8 follows the motion and swivels slightly downwards. The upper surface (upper skin) of the wing system 2 has a roughly continuous surface with at least one slot 40 between the flap and the cover panel 8. The size of the slot 40 may be adjusted by a suitable design of the support structure 10 and the connecting structure 14.

Figure 3:
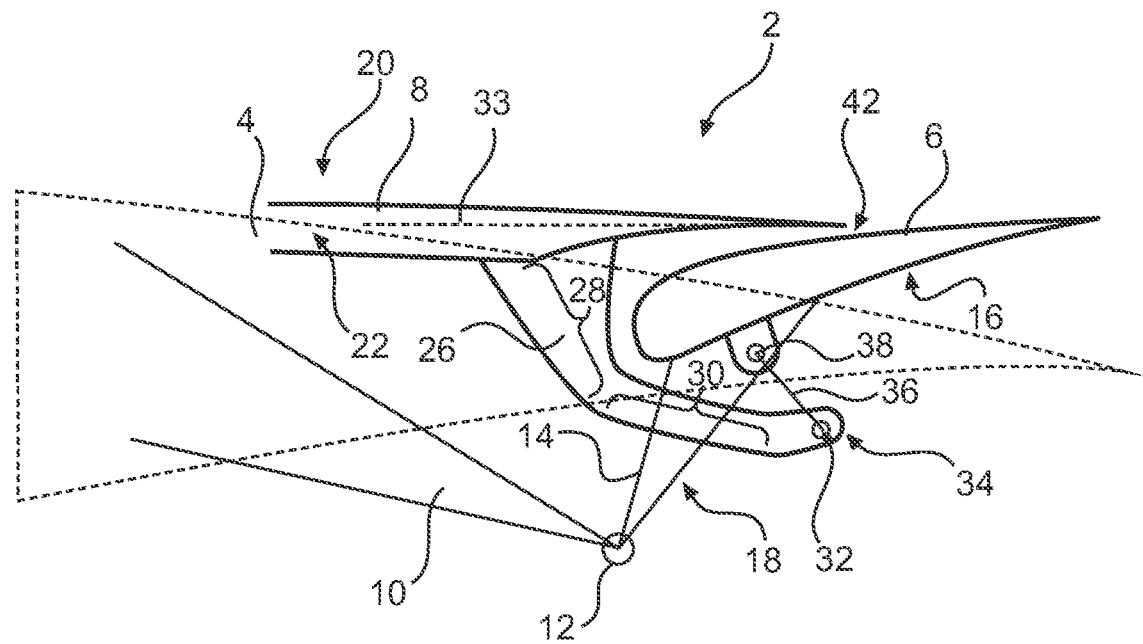
FIG. 3 shows the wing system of FIGS. 1 and 2 with the flow body in an upward deflected position.

In FIG. 3, the flap 6 is moved in an upward direction about roughly 20°. Here, the cover panel 8 is pushed further forward to avoid a damage through the flap 6 and also creates a narrow slot 42. During this motion, the first link 36 pulls the second joint 32 into a forward direction.

Figure 4:
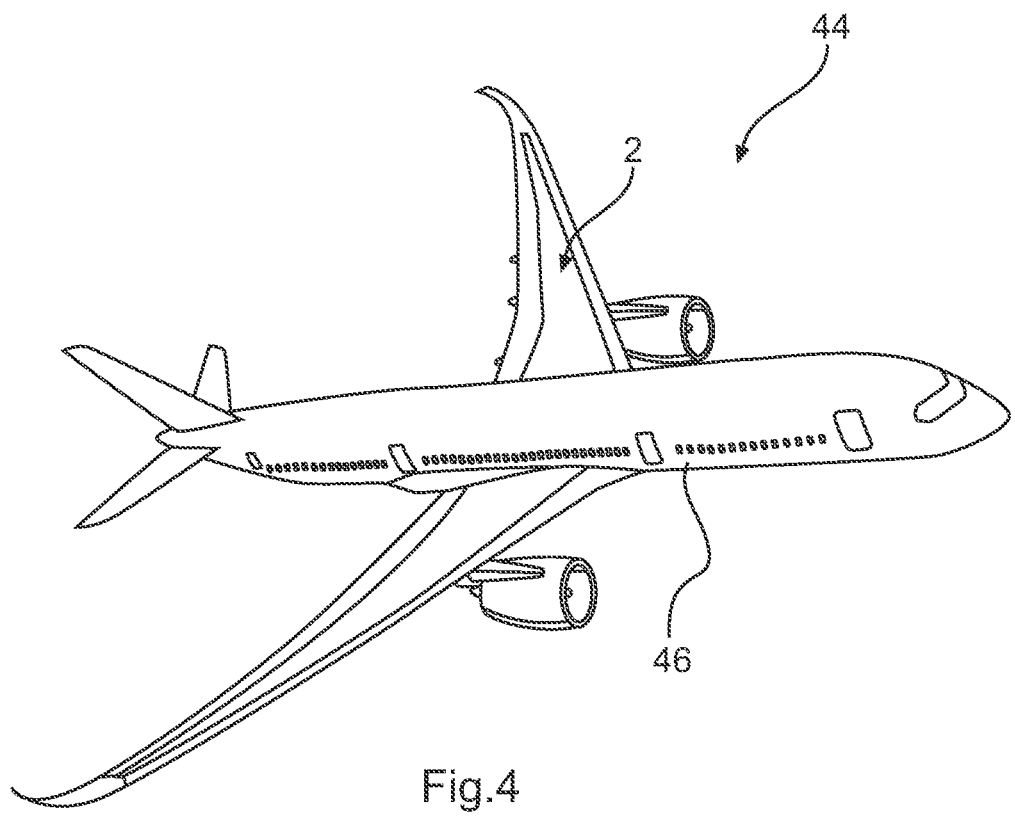
FIG. 4 shows an aircraft having a wing system according to FIGS. 1 to 3.

Finally, FIG. 4 shows an aircraft 44 having two wing systems 2 installed to a fuselage 46. As clear from this illustration, the drawings in FIGS. 1 to 3 only show a cross section. As the flap 6 or another type of flow body extends in a spanwise direction, further support structures 10, first links 36, first joints 12, second joints 32 and third joints 38 may be present to support the flap 6.

In an embodiment, the wing system 2 for an aircraft includes a movable flow body 6 and a cover panel 8, wherein the flow body 6 and the cover panel 8 both are movably supported on a main wing body 4. While the flow body 6 is actively driven into upwards or downwards deflected positions, the cover panel 8 is coupled with the flow body 6 to follow its motion. The cover panel covers a part of the flow body 6 and the main wing body 4 in order to provide a substantially continuous, closed outer contour.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing system for an aircraft comprising:
a main wing body,
a movable flow body,
a cover panel,
a support structure attached to the main wing body,
a first link swivably coupled to the moveable flow body at a first end of the first link, and
a second link rigidly attached to an underside of the cover panel and swivably connected to the first link by a second joint at a distal end of the second link,
wherein the support structure protrudes through a contour of the main wing body,
wherein the moveable flow body is positioned downstream of the main wing body,
wherein the moveable flow body is swivably coupled to a first joint at an end of the support structure, such that the flow body is swivable around the first joint from a neutral position to upwards or downwards deflected positions,
wherein the cover panel is positioned between the main wing body and the moveable flow body,
wherein the cover panel is movably coupled to the main wing body and swivably coupled to a second end of the first link to follow motion of the moveable flow body at least partially,
wherein the main wing body, the cover panel and the moveable flow body are configured to create a closed wing contour at least in the neutral position, and
wherein the second link is not directly connected to the support structure.

2. The wing system of claim 1, wherein the support structure protrudes downwards from a bottom side of the main wing body.

3. The wing system of claim 1, wherein the first joint is arranged forward of a leading edge of the moveable flow body and underneath the cover panel while in the moveable flow body is in a neutral position.

4. The wing system of claim 1, wherein the support structure is rigidly attached to the main wing body.

5. The wing system of claim 1, further comprising a connecting structure attached to an underside of the moveable flow body and coupled to the first joint.

6. The wing system of claim 5, wherein the connecting structure is rigidly attached to the moveable flow body.

7. The wing system of claim 1, wherein the second link extends downwards and rearwards from the underside of the cover panel.

8. The wing system of claim 1, wherein the second joint is below the moveable flow body at least while in the neutral position.

9. The wing system of claim 1, wherein the second link at least partially extends parallel to a chord of the cover panel.

10. The wing system of claim 1, wherein the first joint is arranged forward of the second joint while in the neutral position.

11. The wing system of claim 1, wherein:
the first link is swivably coupled to the moveable flow body at a third joint at an underside of the moveable flow body, and
the third joint is directly above the second joint or displaced in a rearward direction along 25% of a length of a chord of the moveable flow body at a maximum while in the neutral position.

12. An aircraft comprising the wing system of claim 1.

13. An aircraft wing comprising:
a main wing body having an upper skin and a trailing edge;
a support structure attached to the main wing body, and having a distal portion forming a first pivot point;
a cover panel in a slot in the main wing body and above the support structure;
a trailing edge flap aligned with the trailing edge of the main wing and at least partially rearward of the trailing edge, wherein the trailing edge flap is linked to the first pivot point and configured to swivel about the first pivot point between a neutral position and at least one of an upward deflected position and a downward deflected position;
a first link having a first end pivotably connected to the trailing edge flap, and
a second link having a distal end pivotably connected to a second end of the first link, wherein the second link is fixed to the cover panel, extends downwards from and rearward of an underside of the cover panel, and wherein the second link is not directly connected to the support structure.

14. The aircraft wing of claim 13, wherein the second link has a dog-legged shape.

15. The aircraft wing of claim 13, wherein the second link has a proximal end fixed to the cover panel.

16. The aircraft wing of claim 13, wherein the support structure framework extends below a lower skin of the main wing body.

17. The aircraft wing of claim 13, wherein the support structure framework is offset in a spanwise direction of the main wing body from the first and second links.

* * * * *